United States Patent
Ding et al.

(10) Patent No.: US 12,321,193 B1
(45) Date of Patent: Jun. 3, 2025

(54) HIERARCHICALLY-AWARE BUFFERING FOR CLOCK STRUCTURES

(71) Applicant: Cadence Design Systems, Inc., San Jose, CA (US)

(72) Inventors: Yi-Xiao Ding, Austin, TX (US); Sheng-En David Lin, Austin, TX (US); Natarajan Viswanathan, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 91 days.

(21) Appl. No.: 18/347,315

(22) Filed: Jul. 5, 2023

(51) Int. Cl.
  *G06F 1/12* (2006.01)

(52) U.S. Cl.
  CPC ................ *G06F 1/12* (2013.01)

(58) Field of Classification Search
  CPC .................................. G06F 1/12
  USPC .................................. 713/400
  See application file for complete search history.

(56) References Cited

U.S. PATENT DOCUMENTS

| | | | | |
|---|---|---|---|---|
| 5,656,963 A * | 8/1997 | Masleid | ......... | H03K 19/00323 257/786 |
| 5,717,229 A * | 2/1998 | Zhu | ......... | G06F 30/3947 257/776 |
| 5,849,610 A * | 12/1998 | Zhu | ......... | G06F 30/394 438/129 |
| 6,009,248 A * | 12/1999 | Sato | ......... | G06F 30/327 716/122 |
| 6,446,240 B1 * | 9/2002 | Iyer | ......... | G06F 30/33 716/108 |
| 6,542,005 B2 * | 4/2003 | Yamamoto | ......... | G06F 1/10 257/206 |
| 6,728,214 B1 * | 4/2004 | Hao | ......... | H04L 43/50 370/254 |
| 7,472,365 B1 * | 12/2008 | Manaker, Jr. | ......... | G06F 30/3312 716/113 |
| 9,185,003 B1 * | 11/2015 | Allen | ......... | G06F 1/12 |
| 11,526,642 B1 * | 12/2022 | Pan | ......... | G06F 30/396 |
| 2002/0199158 A1 * | 12/2002 | Sano | ......... | G06F 30/394 716/114 |
| 2004/0060019 A1 * | 3/2004 | Secatch | ......... | G06F 30/3312 716/113 |

(Continued)

*Primary Examiner* — Paul R. Myers
(74) *Attorney, Agent, or Firm* — Schwegman Lundberg & Woessner, P.A.

(57) ABSTRACT

Aspects of the present disclosure include system, methods, and software for buffer insertions. In one example, a method includes receiving a clock signal network layout, the clock signal network layout comprising a clock source electrically coupled to a plurality of clock sinks via a plurality of net segments, a first hierarchy that bounds a first region of the clock signal network layout, and a second hierarchy that bounds a second region of the clock signal network layout. The method additionally includes creating a graph representative of the clock signal network layout, the graph comprising a plurality of logical edges, and identifying a to-be-inserted buffer location comprising a location on a net segment of the plurality of net segments to insert a buffer. The method further includes selecting a selected logical edge to insert the buffer based on the to-be-inserted buffer location, the first hierarchy, the second hierarchy, or a combination thereof.

19 Claims, 8 Drawing Sheets

(56) References Cited

U.S. PATENT DOCUMENTS

2011/0191740 A1\* 8/2011 Walker .................. G06F 30/398
                                                716/108
2018/0182440 A1\* 6/2018 Khare .................... G11C 7/222
2021/0390242 A1\* 12/2021 Dabare ................ G06F 30/398

\* cited by examiner

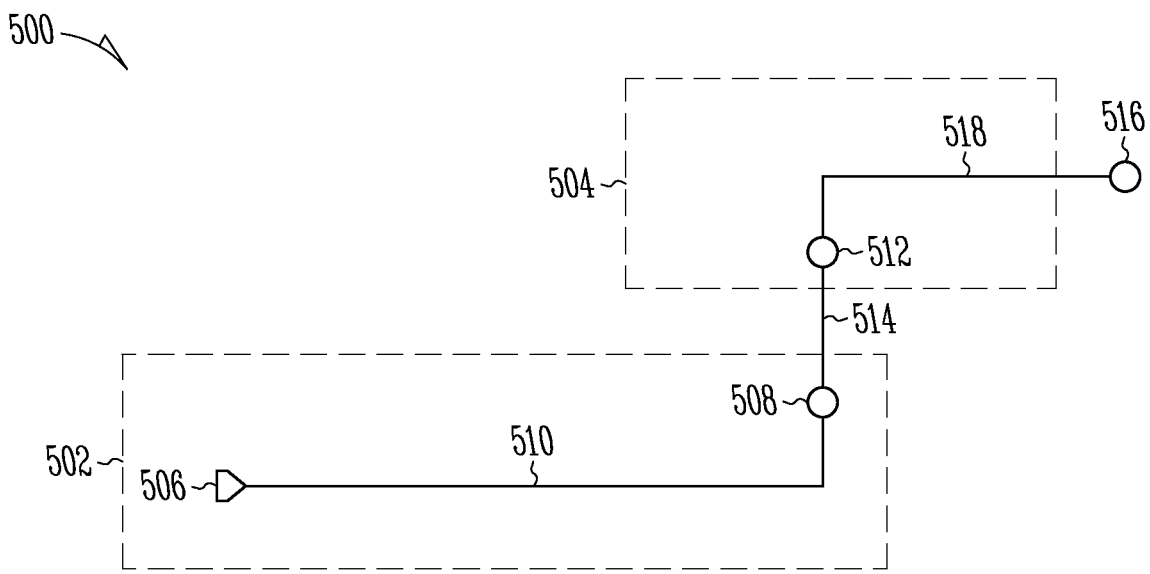
*Fig. 5A*
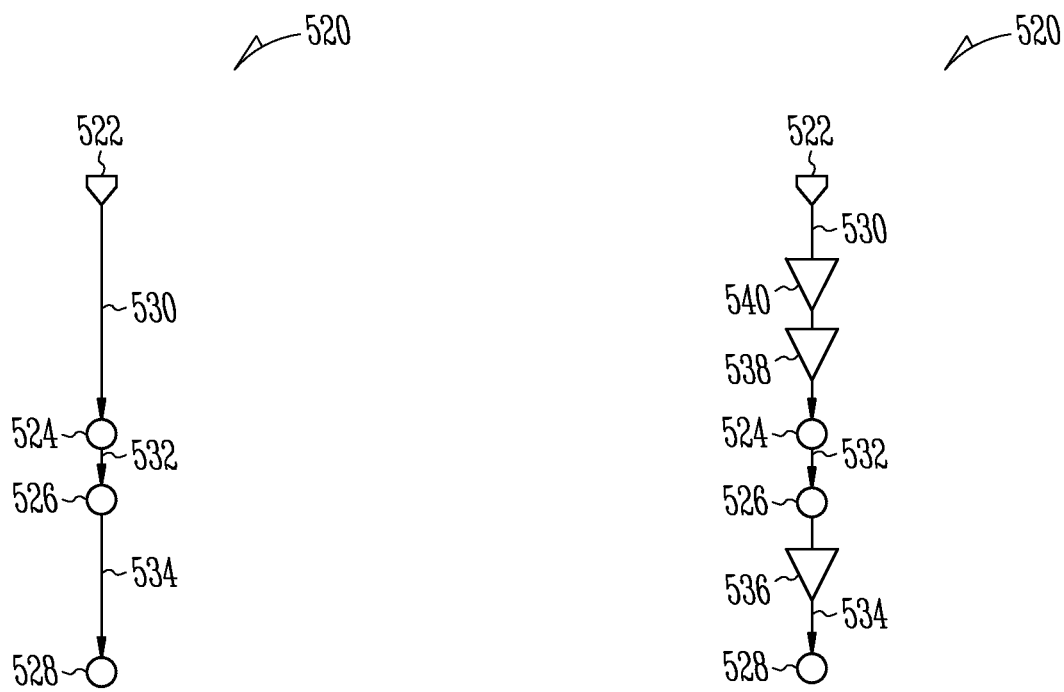
*Fig. 5B*                *Fig. 5C*

US 12,321,193 B1

HIERARCHICALLY-AWARE BUFFERING FOR CLOCK STRUCTURES

TECHNICAL FIELD

The present disclosure generally relates to the technical field of integrated circuit (IC) design. In particular, the present disclosure describes a hierarchically-aware buffer insertion for clock structures.

BACKGROUND

An IC clock transmits a clock signal that synchronizes various components of the IC. A clock structure, such as a clock tree, is an interconnected tree topology that transmits the clock signal from clock tree sources to clock tree sinks. Buffers inserted into the clock tree to improve the delay of the clock signal from the clock tree sources to the clock tree sinks.

BRIEF DESCRIPTION OF THE SEVERAL VIEWS OF THE DRAWINGS

Various ones of the appended drawings merely illustrate example embodiments of the present inventive subject matter and cannot be considered as limiting its scope.

FIG. 5A depicts an example clock source to-clock sink net route that includes two hierarchies, according to some embodiments.

FIG. 5B illustrates an example logical view of the clock source to-clock sink net route of FIG. 5A, according to some embodiments.

FIG. 5C illustrates the example DAG of FIG. 5A with certain buffers inserted based on using a buffering context, according to some embodiments.

DETAILED DESCRIPTION

Figure 1:
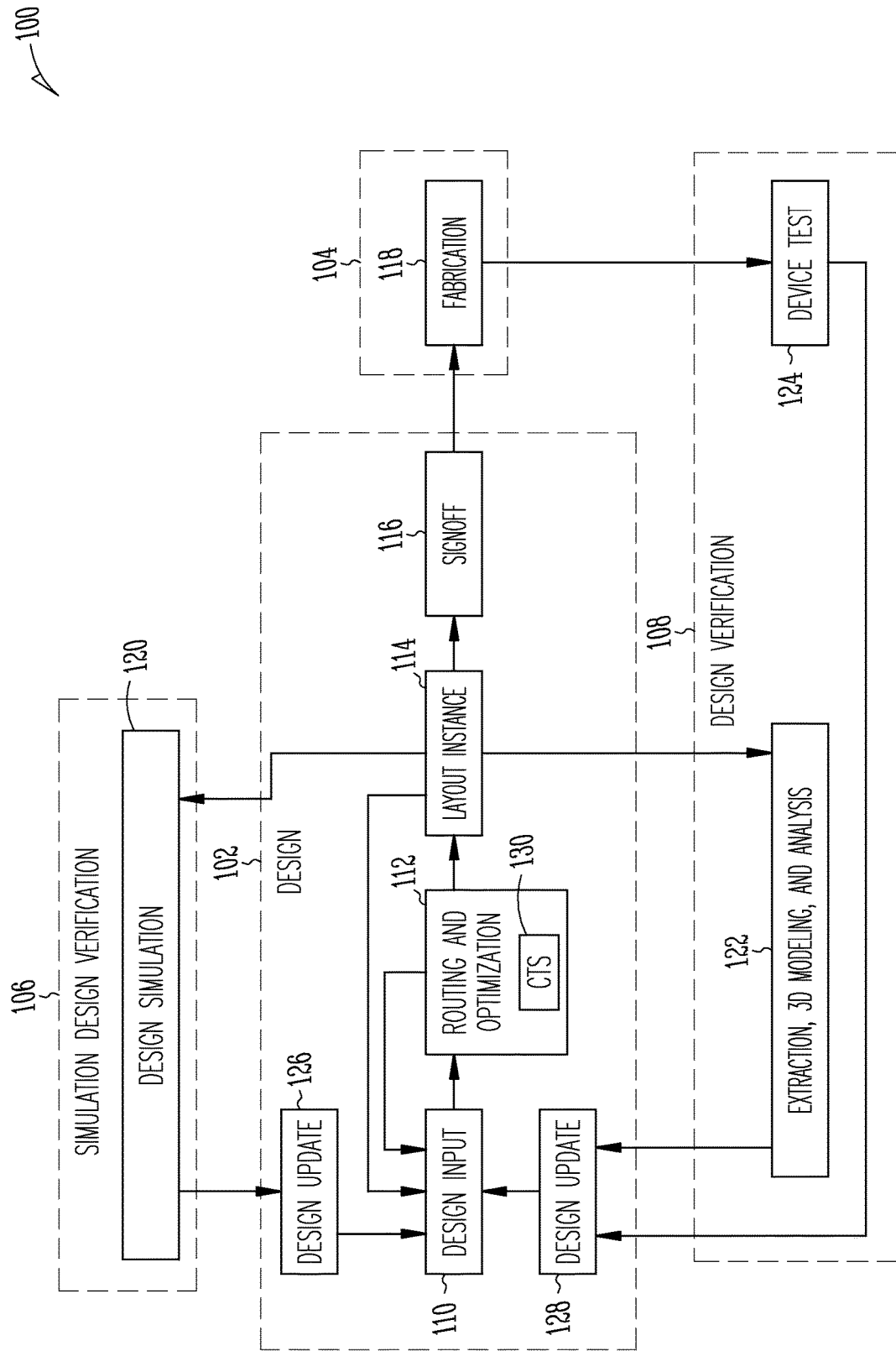
FIG. 1 illustrates an example IC design process flow, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Certain IC devices include clock signals that are transmitted throughout an IC device for various purposes, such as signal synchronization, data transmission, coordinating a sequence of actions, and so on. The IC device includes one or more clock tree sources, such as crystal oscillators, clock generators, and the like, that produce a periodic signal at a desired frequency. The periodic signal is then distributed from the one or more clock tree sources to one or more clock tree sinks via a clock tree network. For example, the clock sinks include registers or flip-flops that can store information, synchronized by the clock signal. In a circuit for using edge-triggered registers, when a clock edge (e.g., rising edge or falling edge) arrives at a register, the data stored at the register is updated.

During a physical design portion of an IC design process, certain circuit components and structures are placed at various locations of an IC layout. For example, during floorplanning and placement, the circuit components are placed to minimize area and wirelengths interconnecting the circuit components. After floorplanning, a clock tree synthesis (CTS) process is used, where clock trees are constructed to propagate clock signals from clock sources to clock sinks. In some examples, the CTS process is used to transmit a clock signal more efficiently to the clock sinks, for example, by using a clock tree network layout having multiple buffers and/or inverters. Various clock tree structures can be used, such as Y-trees, X-trees, H-trees, among others. The CTS process creates a clock tree network layout and inserts buffers in the various locations of clock tree network layout, for example, to improve or balance clock signal transmission delay.

Buffers come in different sizes, for example, larger buffers transmit signals faster with less delay than smaller buffer, but they occupy a larger die area and thus carry a larger cost. During CTS, buffers are inserted throughout the clock tree for various purposes. For example, to minimize skew and to meet target insertion delay. Insertion delay is the time clock signal takes to go from a clock tree source to a clock tree sink. Among a set of clock tree sinks, each sink can have different insertion delays. The skew is the difference between the minimum and maximum insertion delays for a set of clock tree sinks.

Buffer insertion can be used to fix design rule violations (DRVs) such as a slew/signal transition time, a maximum capacitance load, a max fanout (e.g., maximum number of inputs that are connected to one output), and/or max length (e.g., wire length) constraints. As used herein, the term "buffer" refers to both a standard buffer whose output value mirrors its input value and to an inverting buffer (e.g., an inverter) whose output value is a logical opposite of its input value.

ICs contain hierarchies to divide and conquer the design process, where the design can be divided into manageable partitions to be developed in parallel. That is, certain IC designs include hierarchies in schematics useful in compartmentalizing the IC design into, for example, nested structures. For example, a top module or hierarchy (e.g., level 1 or top level) contains multiple submodules or subhierarchies (e.g., level 2 or lower levels) for subcomponent functional units or blocks of the IC design, and in turn the subcomponents contain additional subhierarchies (e.g., level 3, 4, and so on, and each submodule can be a functional unit or block. This hierarchical approach provide for a more efficient way to design large ICs that contain millions of instances compare to the flat approach. The flat approach works on all the instances at once without any hierarchies, which can result in large memory requirements and slow run time.

The techniques described herein provide for a buffer insertion technique for clock tree nets that span across design hierarchies or modules. In certain examples, a bottom-up process begins at clock tree sinks driven by a to-be-inserted buffer, and traverses the DAG in a bottom up manner to collect the DAG edges connected to the to-be-inserted buffer. The DAG is a logical representation of the physical clock tree (e.g., clock signal network). The DAG is a graph containing nodes and edges that represent clock tree components and the connections between them. The bottom-up traversal stops when it encounters a port (e.g., a module port). Once a port is found, then a logical edge driving the port is collected and, for each DAG edge(s) collected during the bottom up traversal, a corresponding buffering context (e.g., module context and power domain context in combination) is derived. For the buffering contexts derived from the DAG edges, the techniques herein determine the more optimal buffering context to insert the buffer. The more optimal buffering context will be the one requiring the least legalization deviation from the desired location determined by a buffering engine.

It may be beneficial to illustrate an example IC design process flow that incorporates the techniques described herein. Turning now to FIG. 1, the figure is a block diagram illustrating an example IC design process flow 100 that includes net partitioning and layer-based parasitic extraction, according to some examples. As shown, the IC design process flow 100 includes a design phase 102, a device fabrication phase 104, a simulation design verification phase 106, and a design verification phase 108. The design phase 102 involves an initial design input operation 110 where the basic elements and functionality of a device are determined, as well as revisions based on various analyses and optimization of a circuit design. This design input operation 110 is where block (e.g., functional) instances are used in the circuit design and any additional circuitry for the design around the blocks is selected. For example, a variety of electronic components such as amplifiers, registers, signal generators, and so on, may be provided as blocks to be used for a given device, e.g., radio frequency (RF) device. The initial strategy, tactics, and context for the device to be created are also generated in the design input operation 110 operation, depending on the particular design algorithm to be used.

In some embodiments, following an initial selection of design values in the design input operation 110, routing, timing analysis, and optimization are performed in a routing and optimization operation 112 operation, along with any other automated design processes. While the design process flow 100 shows the routing and optimization operation 112 occurring prior to a layout instance 114, routing, timing analysis, and optimization may be performed at any time to verify operation of a circuit design. For instance, in various examples, timing analysis in a circuit design may be performed prior to routing of connections in the circuit design, after routing, during register transfer level (RTL) operations, or as part of a signoff 116 as described below.

The routing and optimization operation 112 includes deriving various interconnections or routes between, for example, devices, pins, networks, layers, and so on. Accordingly, connection paths between pins and other components are generated as part of the routing and optimization operation 112. After design inputs are used in the design input operation 110 to generate a circuit layout and the routing and optimization operation 112 is performed, a layout is generated in the layout instance 114. The layout describes the physical layout dimensions of the device that match the design inputs. The layout instance 114 also includes one or more layers, e.g., metal layers, that define interconnections and components for each layer. Prior to the layout instance 114 being provided to a fabrication operation 118, the signoff 116 is performed on the circuit design defined by the layout instance 114. The signoff 116 includes verification steps that the layout instance 114 passes before being sent for manufacture.

After signoff verification via the signoff 116, a verified version of the layout instance 114 is used in the fabrication operation 118 to manufacture a device. Additional testing and design updates 126, 128 may be performed using designer inputs or automated updates based on design simulation operation 120 operations, or via extraction, three-dimensional (3D) extraction, 3D modeling, and analysis operations 122. Once the device is generated, the device can be tested as part of device test 124 operations and layout modifications generated based on actual device performance.

In the illustrated example, a clock tree synthesis process 130 is shown. The clock tree synthesis process 130 creates certain clock signal network layouts, by using certain structures, e.g., Y-trees, X-trees, H-trees, fishbone, and/or mesh, for the distribution of a clock signal among sequential parts (e.g., sequential logic parts) of the IC design process flow 100. Buffers are additionally placed at various locations of the clock signal network layout, including locations that cross hierarchies, to minimize skew of the clock signal, to meet a target insertion delay, and to improve robustness of the layout. Each of the structures used for the clock signal network layout have certain advantages. For example, by using an H-tree layout, cross-corner scaling is better balanced, with clock sinks at corners of the layout receive the clock signal with minimal or no delay. Using an X-tree can save on interconnect length for certain net segments, while Y-tree, when used a higher tree levels, provides for reduce power consumption. The H-tree, X-tree, and Y-tree structures can be used in combination as part of a clock signal network layout.

Once the clock signal network layout is created, a hierarchically-aware buffer insertion process begins at clock sinks of the clock signal network layout, for example, in a hierarchy other than a hierarchy having the clock source. In certain examples, the process then traverses a DAG in a bottom up manner collecting the DAG's edges until a port node is found. The DAG is a logical representation of the physical clock signal network layout. Once the port is found, a logical edge driving the port is also collected and, for each collected logical edge, a buffering context (e.g., module context, power domain context) is derived. Buffer compatible contexts are then used to determine a location to insert buffers, and one or more buffers can then be inserted across hierarchies, as further described below.

Figure 2:
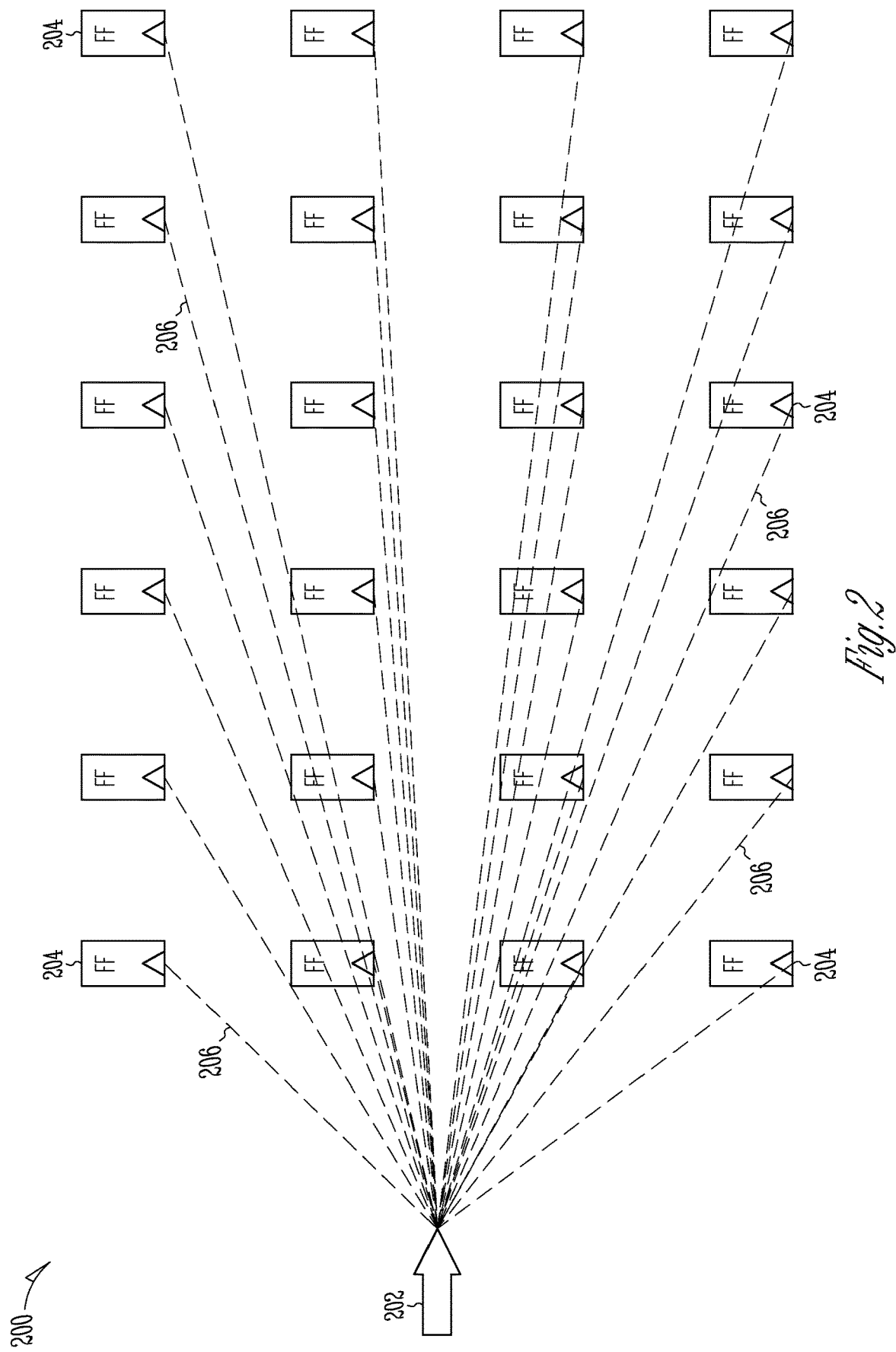
FIG. 2 illustrates an example circuit layout having a clock source and multiple clock sinks, according to some embodiments.

It may be beneficial to illustrate an example circuit layout that incorporates a clock source and various clock sinks as part of a clock signal network. Turning now to FIG. 2, the figure illustrates an example circuit layout 200 having a clock source 202 electrically coupled to multiple clock sinks 204, e.g., flip-flops, according to some examples. More specifically, the clock source 202 illustrated in the figure is directly connected to the clock sinks 204 via direct paths 206. The resulting circuit layout 200, however, results in the clock sinks receiving a clock signal transmitted by the clock source 202 at different times, due, for example, to the different locations of the clock sinks 204 relative to the clock source 202. Clock sinks 204 closer to the clock source 202 will receive the clock signal before other clock sinks farther away from the clock source 202, resulting in unwanted skew and insertion delays. For example, resistance-capacitance (RC) variations among the direct path 206 caused by resistance and capacitance of nets along the direct paths 206 will in turn create skew and insertion delays. Additionally, RC and length variations of the direct paths 206 can result in jitter issues, clock signal integrity issues, noise issues, and so on.

Figure 3A:
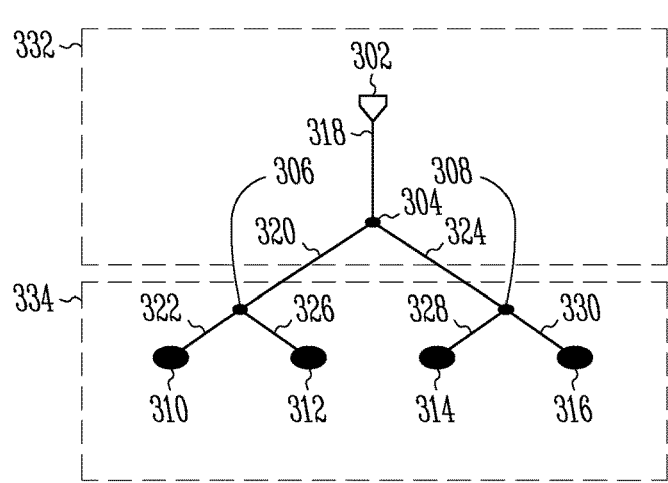
FIG. 3A illustrates an example Y-Tree clock signal network structure with hierarchies, according to some embodiments.
Figure 3B:
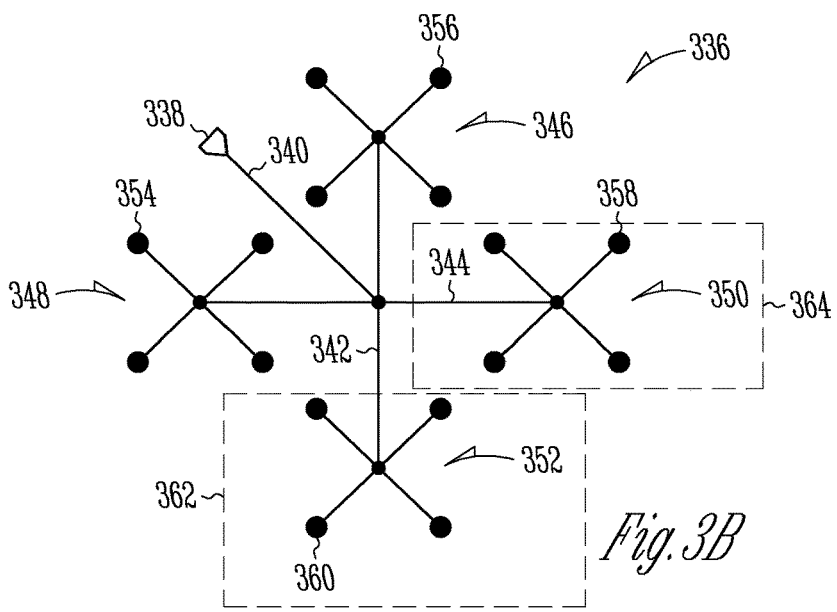
FIG. 3B illustrates an example X-Tree clock signal network structure with hierarchies, according to some embodiments.
Figure 3C:
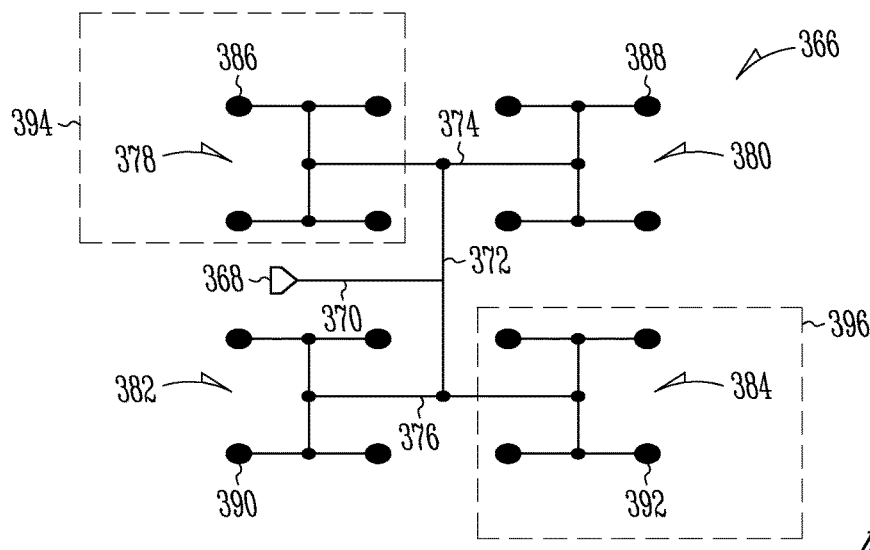
FIG. 3C illustrates an example H-Tree clock signal network structure with hierarchies, according to some embodiments.

Clock signal networks can be created that use certain structures, as shown in FIGS. 3A-3C, that provide for improved clock signal propagation, minimal (or no skew), and robustness, among other enhancements, when compared to the circuit layout 200, according to some examples. In the depicted example of FIG. 3A, an example Y-tree structure 300 is shown. The Y-tree structure receives a clock signal via a clock source 302, and distributes the clock signal into nodes 304-314 through net segments 316-326. In some examples, nodes 304, 306 are buffers that provide for improved timing and signal quality as the signal travels into nodes 308-314. Nodes 308-314 can be clock sink nodes (e.g., flip-flops) that then receive the clock signal and the provide further logic signals to one or more sequential components of an IC design. The Y-tree structure 300 Y-tree, when used a higher tree levels or in shorter trees, provides for reduce power consumption.

Also shown are two hierarchies 332, 334. The hierarchies 332, 334, are used, for example, to divide certain schematics into one or more functional blocks to more efficiently design large ICs that can contain millions of instances. For example, the hierarchy 332 may include a power control module while hierarchy 334 may include a power conversion module. The power control module included in hierarchy 332 is then operatively coupled to the power conversion module included in hierarchy 334. Any functional components can be placed in hierarchies and connected to other hierarchies, improving circuit design efficiency.

In the depicted example of FIG. 3B, an example, X-tree structure 336 is shown. The X-tree structure 336 includes a clock source 338 transmitting the clock signal through a diagonal trace 340 into a vertical net segment 342 and a horizontal net segment 344. The signal is further transmitted by the vertical net segment 342 and the horizontal net segment 344 into X clusters 346, 348, 350, 352. Each of the X clusters 346, 348, 350, 352 contains four nodes, such as four end nodes (e.g., clock tree sinks) 354, 356, 358, 360, respectively. In some examples, buffers may be placed along clock tree nets of the X-tree structure 336 to further improve timing and clock signal transmission. Using the X-tree structure 336 can save interconnect length for certain clock trees. Hierarchies 362 and 364 are also shown in FIG. 3B. Hierarchies 362, 364 bound regions of the clock tree layout as shown. That is, a hierarchy can represent a functional module or block (e.g., power supply, communications module, signal processing module, and so on).

An example H-tree structure 366 is shown in the example illustrated in FIG. 3C. In the depicted example, a clock source 368 is connected to a central net 370 and in turn the central net 370 is connected to a vertical net 372. The vertical net 372 is in turn connected to horizontal nets 374, 376. The horizontal nets 374, 376 are then connected to H clusters 378, 380, 382, 384. Each of the H clusters 378, 380, 382, 384 contains four nodes, such as four end nodes (e.g., clock tree sinks) 386, 388, 390, 392, respectively. Clock tree nets 372, 374, 376 form a Latin letter "H", which is electrically connected to H clusters 378, 380, 382, 384, hence the name "H-tree." In some examples, buffers may be inserted along the various clock tree nets of the H-tree structure 366 to further improve timing and clock signal transmission. Using the H-tree structure 366 provides for improved signal timing and cross-corner scaling. Also shown are hierarchies 394, 396. As mentioned earlier, the hierarchies 394, 396 can completely bound regions in schematic diagrams, such as regions that contain one or more modules.

Clock signal networks can be built from structures such as the Y-tree structure 300, the X-tree structure 336, and/or the H-tree structure 366, to provide for improved signal transmission and signal quality. Other structures can also be used, such as mesh structures, other tree structures, geometric structures, and the like. The structures, including the Y-tree structure 300, the X-tree structure 336, and the H-tree structure 366, can also be combined with each other. Buffers can be inserted along clock tree nets in any of the aforementioned structures, e.g., Y-tree structure 300, X-tree structure 336, and H-tree structure 366. Each physical tree structure (e.g., Y-tree structure 300, X-tree structure 336, and H-tree structure 366) has a corresponding logical equivalent DAG.

Figure 4:
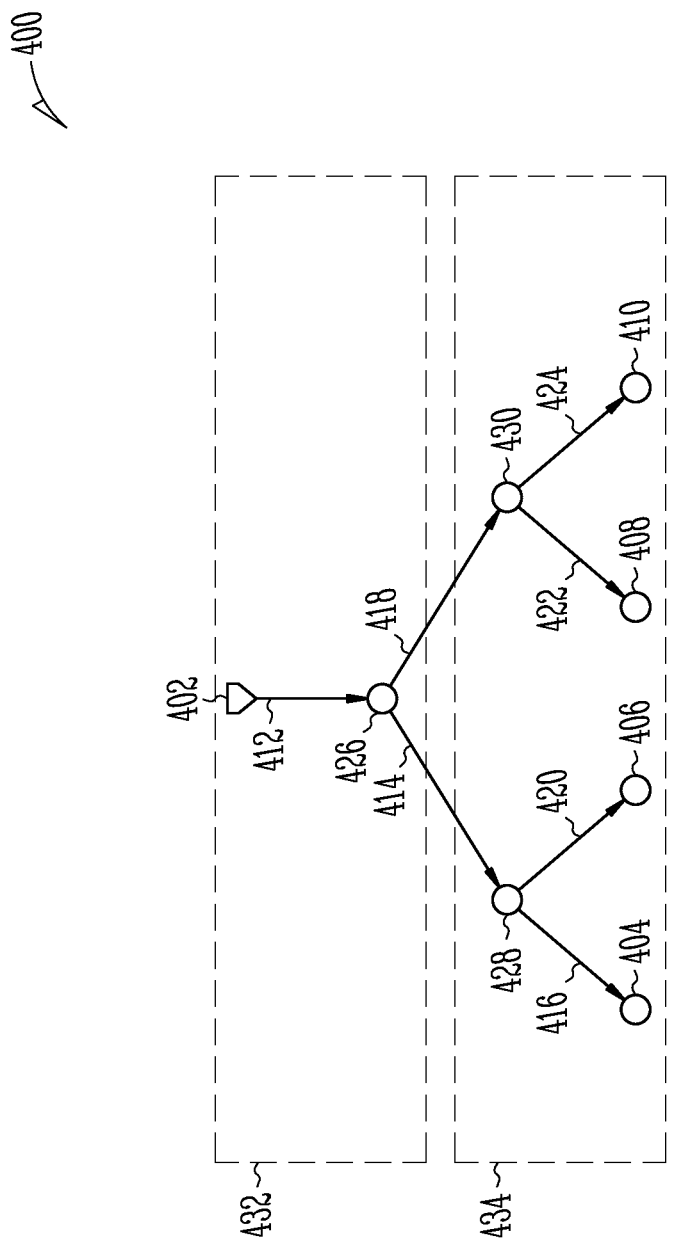
FIG. 4 illustrates an example directed acyclic graph (DAG) corresponding to the Y-tree structure of FIG. 3A, according to some embodiments.

FIG. 4 illustrates an example DAG 400 corresponding to the Y-tree structure 300 of FIG. 3A, according to some examples. A DAG is just the abstraction for a physical clock tree. Analogy would be similar to a map being an abstraction for corresponding physical locations. A clock structure, such as the Y-tree structure 300, is converted into a DAG by replacing net segments between nodes (e.g., clock source nodes, clock sink nodes), with directed edges. The directed edges indicate the direction of the clock signal travelling from clock tree sources to clock tree sinks, e.g., from clock tree source node 402 to clock tree sink nodes 404, 406, 408, 410. In the depicted embodiment corresponding to clock tree 300, clock tree net 318 of the Y-tree structure 300 corresponds to DAG edge 412, clock tree net 320 of the Y-tree structure 300 corresponds to DAG edge 414, clock tree net 322 of the Y-tree structure 300 corresponds to DAG edge 416, clock tree net 324 of the Y-tree structure 300 corresponds to DAG edge 418, clock tree net 326 of the Y-tree structure 300 corresponds to DAG edge 420, clock tree net 328 of the Y-tree structure 300 corresponds to DAG edge 422, and clock tree net 330 of the Y-tree structure 300 corresponds to DAG edge 424. Accordingly, clock tree source node 302 of the Y-tree structure 300 corresponds to clock tree source node 402, and clock tree sinks 310, 312, 314, 316 corresponds to clock tree sink nodes 404, 406, 408, 410, respectively, of the DAG 400. Clock nodes 304, 306, 308 of the Y-tree structure 300 then correspond to nodes 426, 428, 430, respectively of the DAG 400. Indeed, any physical schematic has a corresponding logical representation, and vice versa. In the depicted embodiment, hierarchies 432, 434 are representative of the hierarchies 332, 334 shown earlier in FIG. 3A. The techniques described herein, for example, can use the DAG 400 representation to traverse the DAG 400 via a bottom-up approach as further described in FIGS. 5A, 5B, 5C.

FIG. 5A depicts an example clock source to-clock sink net 500 (e.g., physical design view) that crosses two hierarchies 502, 504, according to some examples. In the depicted example, a clock tree net driver (e.g., clock tree source) 506 connects to a clock tree sink which crosses two module ports 508 and 512. The port 508 is electrically connected to a node 512 via a net segment 514, and the node 512 is electrically coupled to a clock sink 516 via a net segment 518. A buffering engine or buffering algorithm returns a buffering solution which consists of one or more buffers of same or different sizes that are placed at different locations along the nets. And each of the buffer needs to be inserted/committed into the layout. The buffer insertion process then will traverse a DAG representative of the clock tree net 500, as shown in FIG. 5B.

FIG. 5B illustrates an example DAG 520 representative of a logical view of the clock tree net 500, according to some examples. In the depicted example, node 522 is equivalent to the clock tree net driver 506 of FIG. 5A, and nodes 524, 526, 528 of the DAG 520 are equivalent to nodes 508, 512, and 516 of the clock tree net 500. Edges 530, 532, 534 are directed edges equivalent to nets 510, 514, 518. Given that the DAG 520 assumes that the buffering engine prefers to insert a buffer driving sink 528, bottom-up process would begin from the sink until it hits a port 526, and collect the DAG edges along the nets. In this case, edges 532 and 534 would be collected In our example, nodes 524 and 526 are both port nodes (e.g., output and input, respectively).

A port in a schematic is a junction element where one or more nets connect and transfer signals between different hierarchies/modules. In the depicted example, node 524 is representative of an output port (e.g., equivalent to port 508 of the clock tree net 500) and node 526 is representative of an input port (e.g., equivalent to port 512 of the clock tree net 500). After the collection of DAG edges, a corresponding buffering context is determined for each DAG edge based on the relevant physical and logical attributes from the begin and end nodes of the DAG edge.

FIG. 5C illustrates the example DAG 520 of FIG. 5A with certain buffers inserted based on using a buffering context, according to some examples. Once all the related buffering contexts are derived from the DAG edges, the next step is to find the more optimal buffering context to insert/commit the buffer into the layout and the DAG. The more optimal buffering context would be the one which requires the minimal legalization deviation from the desired location. In our example, in FIG. 5B, there are two buffering contexts corresponding to DAG edges 534 and 532, and the desired physical location for the buffer is along the net segment 518 of FIG. 5A. Among the two buffering contexts, the one corresponding to DAG edge 534 is the more optimal one as it requires no legalization deviation, while the one for DAG edge 532 in FIG. 5B would move the buffer outside module/hierarchy 504 in FIG. 5A to the closest location along net segment 514 in FIG. 5A. Accordingly, buffer 536 will be committed using the buffering context corresponding to DAG edge 534 as shown in FIG. 5C.

Figure 6:
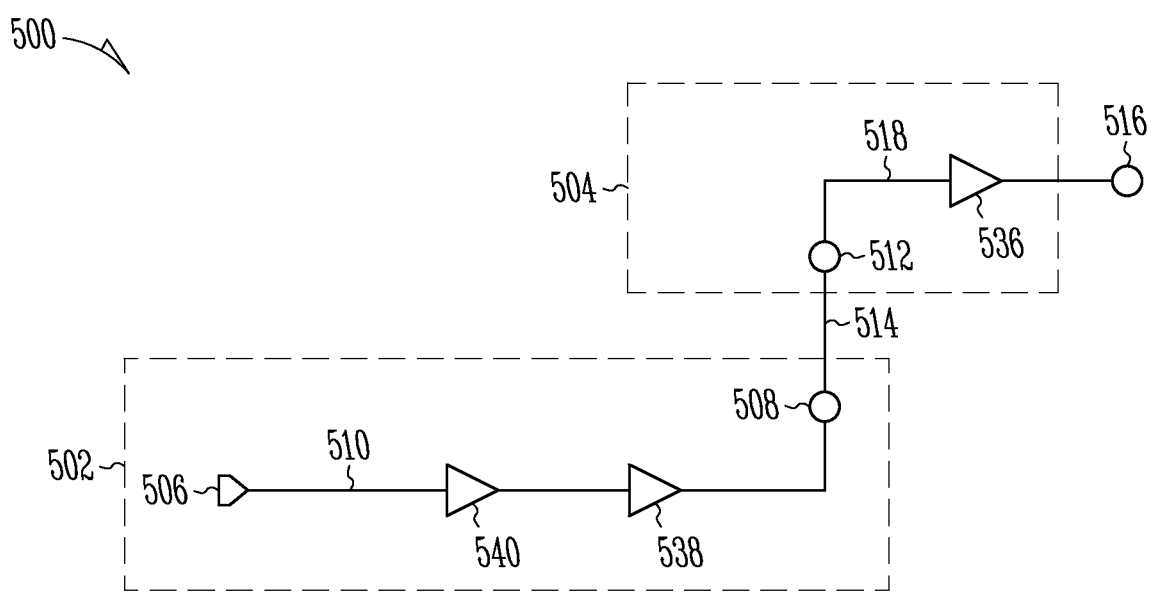
FIG. 6 illustrates the example clock source to-clock sink net route of FIG. 5A with certain buffers now inserted, according to some embodiments.

FIG. 6 depicts the example clock tree net 500 (e.g., physical design view) of FIG. 5A with the buffer 536 now inserted, according to some examples. In the depicted example, the clock tree net 500 illustrates the physical equivalent of the DAG 520 of FIG. 5C. That is, the buffer 536 is now inserted into the physical layout. The hierarchically aware buffer insertion techniques described herein can improve quality of results by finding the more optimal buffering context to insert/commit a given buffer from the buffering engine. Without considering hierarchies, the buffering context is unknown for the buffer and location returned by the buffering engine. Using a random context to commit may not satisfy all the hierarchical constraints, and may result in no buffer inserted or buffer inserted far away from the desired location, both of which can degrade quality of the buffering solution and thus design metrics.

Figure 7:
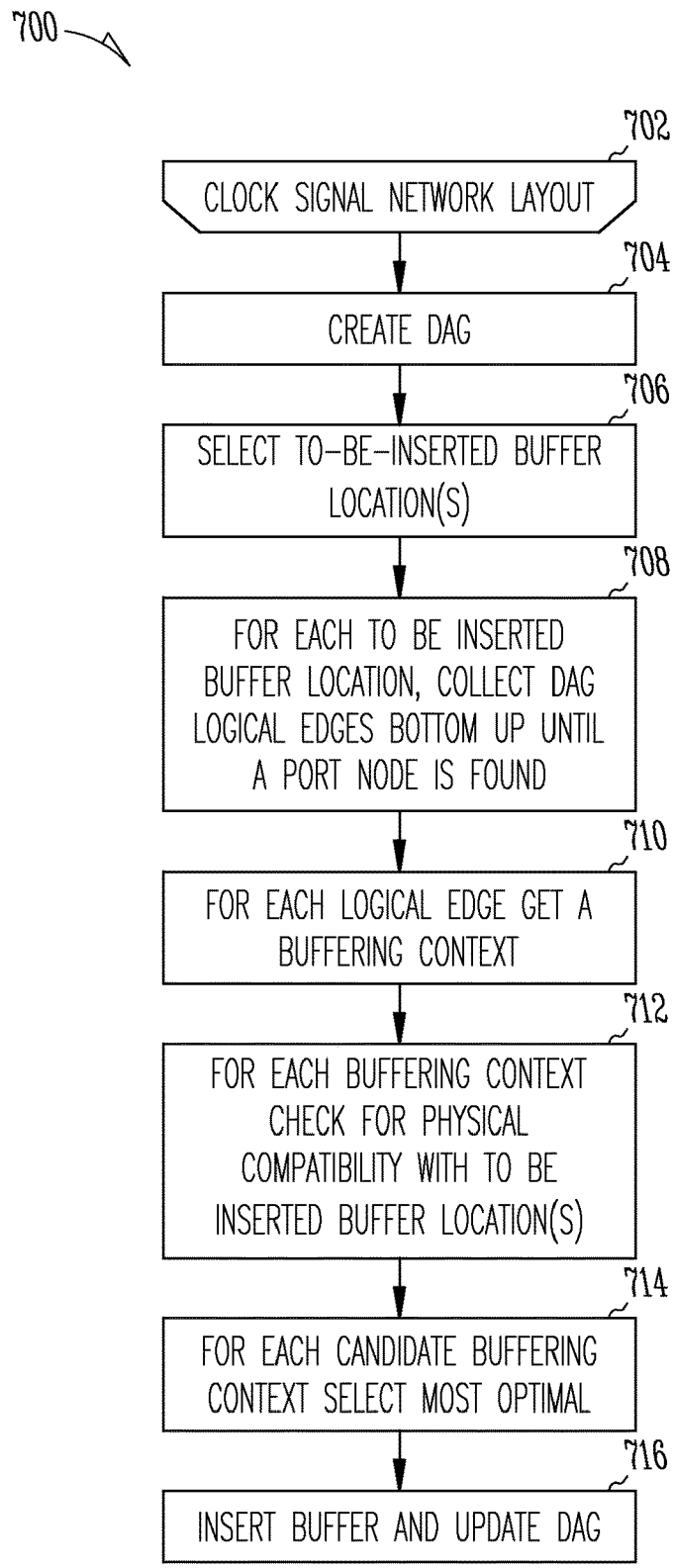
FIG. 7 is a flowchart of an example hierarchically-aware buffer insertion process, according to some embodiments.

FIG. 7 is a flowchart depicting an example hierarchically-aware buffer insertion process 700 for buffer insertion, according to some examples. In the depicted embodiment, the process 700 receives as inputs 702 a buffer cell types and a location for the buffer cell type from a buffering engine. The process 700 then acquires or creates, at block 704, a corresponding DAG representation for the clock tree net being buffered. As mentioned above, the DAG includes nodes and directed edges corresponding to the clock tree net being buffered, including ports that traverse hierarchies.

The process 700, at block 708, collect DAG edges found during the bottom-up traversal, including an edge driving the port node that was found. For each DAG edge collected, the process 700, at block 710, gets a corresponding buffering context. For each buffering context, the process 700 then derives the legalization deviation. For example, a call to a legalizer that includes the desired buffering location will then provide the legalization derivation. The legalization derivation is a distance derivation from the closest clock sink. The buffer context includes a module context and a power context. The module context is the module that includes the possible buffer, such as a functional module (e.g., communications module, memory module, and so on). The power context includes buffers connected to the same power supply. The process 700 selects, at block 714, the buffering context having the minimal legalization deviation. The selected buffering context is considered the most optimal.

The process 700, at block 716, then uses the most optimal buffering context and its corresponding legalized location to insert the buffer and update both the DAG and the physical layout for the clock tree net. By providing for hierarchically-aware buffer insertion process 700, the techniques described herein can more optimally insert buffers across multiple hierarchies.

Figure 8:
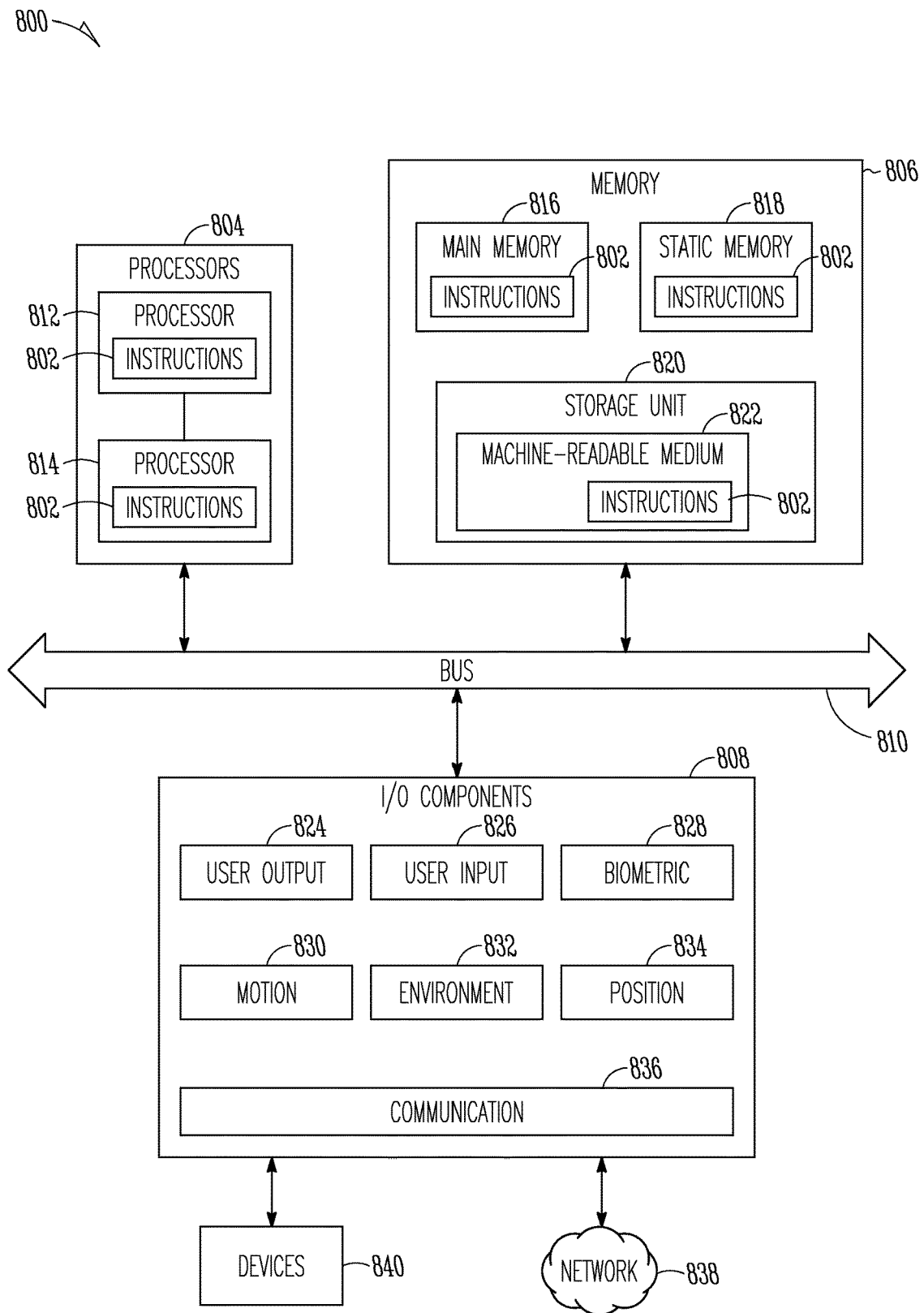
FIG. 8 is a block diagram depicting a machine suitable for executing instructions via one or more processors, according to some embodiments.

FIG. 8 is a diagrammatic representation of a machine 800 within which instructions 802 (e.g., software, a program, an application, an applet, an app, or other executable code) for causing the machine 800 to perform any one or more of the methodologies discussed herein may be executed. For example, the instructions 802 may cause the machine 800 to execute any one or more of the processes or methods described herein, such as the process 700. The instructions 802 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 802, sequentially or otherwise, that specify actions to be taken by the machine 800. Further, while a single machine 800 is illustrated, the term "machine" shall also be taken to include a collection of machines that individually or jointly execute the instructions 802 to perform any one or more of the methodologies discussed herein. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 808, which may be configured to communicate with each other via a bus 810. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 812 and a processor 814 that execute the instructions 802. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 816, a static memory 818, and a storage unit 820, both accessible to the processors 804 via the bus 810. The main memory 816, the static memory 818, and storage unit 820 store the instructions 802 embodying any one or more of the methodologies or functions described herein. The instructions 802 may also reside, completely or partially, within the main memory 816, within the static memory 818, within machine-readable medium 822 within the storage unit 820, within at least one of the processors 804 (e.g., within the processor's cache memory), or any suitable combination thereof, during execution thereof by the machine 800.

The I/O components 808 may include a wide variety of components to receive input, provide output, produce output, transmit information, exchange information, capture measurements, and so on. The specific I/O components 808 that are included in a particular machine will depend on the type of machine. For example, portable machines such as mobile phones may include a touch input device or other such input mechanisms, while a headless server machine will likely not include such a touch input device. It will be appreciated that the I/O components 808 may include many other components that are not shown in FIG. 8. In various examples, the I/O components 808 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 808 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 808 further include communication components 836 operable to couple the machine 800 to a network 838 or devices 840 via respective coupling or connections. For example, the communication components 836 may include a network interface component or another suitable device to interface with the network 838. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 840 may be another machine or any of a wide variety of peripheral devices (e.g., a peripheral device coupled via a universal serial bus (USB) port), internet-of-things (IoT) devices, and the like.

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 816, static memory 818, and memory of the processors 804) and storage unit 820 may store one or more sets of instructions and data structures (e.g., software) embodying or used by any one or more of the methodologies or functions described herein. These instructions (e.g., the instructions 802), when executed by processors 804, cause various operations to implement the disclosed examples.

The instructions 802 may be transmitted or received over the network 838, using a transmission medium, via a network interface device (e.g., a network interface component included in the communication components 836) and using any one of several well-known transfer protocols (e.g., hypertext transfer protocol (HTTP)). Similarly, the instructions 802 may be transmitted or received using a transmission medium via a coupling (e.g., a peer-to-peer coupling) to the devices 840.

A cloud deployment and/or cloud computing is supported by having certain components of the machine 800, e.g., processors 804, memory 806, bus 810, and/or I/O components 808 included in a cloud environment and used via cloud-based techniques. For example, certain components of the machine 800 may be disposed in cloud server facilities and communicatively coupled to client devices 840 to execute the process flow 100 or portions of the process flow 100 "in the cloud." Accordingly, processes, such as process 700, can be cloud-based processes executable in the cloud. That is, a user can access the techniques described herein in the cloud to create, modify, and/or deploy a variety of IC designs and IC features.

The techniques described herein provide for a hierarchically-aware buffer insertion process that considers hierarchies in a clock tree undergoing buffering. With the techniques described, multiple hierarchies can be used in the design of a clock signal network, with the clock signal network spanning across hierarchies. The hierarchically-aware buffer insertion process selects a more buffering context to insert/commit the given buffer and location from the buffering engine. A DAG representation of the clock tree net is used to collect the relevant DAG edges and its corresponding buffering contexts. The buffering context with minimal legalization deviation from the desired location is found and used to insert and commit the buffer. Accordingly, the techniques described herein improve signal quality for nets crossing hierarchies and improve timing issues.

What is claimed is:

1. A system comprising:
   one or more processors of a computing machine; and
   a computer storage medium storing instructions, which when executed by the one or more processors, cause the computing machine to perform operations comprising:
   receiving a clock signal network layout that comprises:
   a clock source electrically coupled to a plurality of clock sinks via a plurality of net segments;
   a first hierarchy bounding a first region of the clock signal network layout; and
   a second hierarchy bounding a second region of the clock signal network layout;
   creating a graph representative of the clock signal network layout, the graph comprising a plurality of logical edges, wherein the graph comprises a directed acyclic graph (DAG) and the plurality of logical edges comprise a plurality of directed edges;
   identifying a to-be-inserted buffer location that comprises a location on a net segment of the plurality of net segments to insert a buffer;
   selecting a selected logical edge from the plurality of logical edges used to insert the buffer based on at least one of the to-be-inserted buffer location, the first hierarchy, the second hierarchy, or a combination thereof, wherein the selecting of the selected logical edge comprises:
   identifying a set of directed edges from the plurality of directed edges of the DAG;
   assigning a buffering context comprising a power domain metric to each of the directed edges in the identified set; and
   using the buffering context of each of the directed edges in the identified set to select the selected logical edge; and
   inserting the buffer into the clock signal network layout based on the selected logical edge.

2. The system of claim 1, wherein the buffering context comprises the power domain metric, a module domain metric, or a combination thereof.

3. The system of claim 1, wherein the identifying of the set of directed edges from the plurality of directed edges of the DAG comprises navigating the DAG via a bottom up traversal.

4. The system of claim 3, wherein the identifying of the set of directed edges from the plurality of directed edges of the DAG, comprises:
   navigating the DAG via the bottom up traversal until a port node is reached;
   identifying all directed edges of the plurality of directed edges traversed during the navigation; and
   identifying a directed edge upstream of the port node that points to the port node.

5. The system of claim 1, wherein the power domain metric comprises a proximity measure to a power domain location from the to-be-inserted location based on a respective directed edge in the identified set of directed edges.

6. The system of claim 2, wherein the module metric is representative of a hierarchy having a module, is representative of a proximity of the to-be-inserted buffer location to the module, or a combination thereof.

7. The system of claim 6, wherein the using of the buffering context of each of the directed edges in the identified set to select the selected logical edge comprises selecting the buffering context of all directed edges in the identified set that have at least one of a lowest proximity measure, a lowest module metric, or combination thereof.

8. The system of claim 1, wherein the identifying of the to-be-inserted buffer location comprises simulating the clock signal network layout to determine that a skew occurs at a clock sink of the plurality of clock sinks and deriving the to-be-inserted buffer location to minimize or to eliminate the skew.

9. The system of claim 1, wherein the clock signal network layout comprises at least one of a Y-tree structure, an X-tree structure, an H-tree structure, or a combination thereof.

10. The system of claim 1, wherein the first region completely encloses a first integrated circuit (IC) module schematic.

11. The system of claim 10, wherein the second region completely encloses a second IC module schematic, and wherein the first IC module schematic is electrically coupled to the second IC module schematic.

12. The system of claim 1, wherein the operations comprise evaluating the buffer to determine whether a design rule violation (DRV) exists before inserting the buffer into the clock signal network layout.

13. The system of claim 12, wherein determining that a DRV exists comprises at least one of:
   determining that maximum transition time on input pins of the clock signal network layout has been exceeded; or
   determining that a maximum capacitive load on output pins of the clock signal network layout has been exceeded.

14. The system of claim 1, wherein the buffer comprises an inverter.

15. A method, comprising:
   receiving a clock signal network layout that comprises:
   a clock source electrically coupled to a plurality of clock sinks via a plurality of net segments;
   a first hierarchy bounding a first region of the clock signal network layout; and
   a second hierarchy bounding a second region of the clock signal network layout;
   creating a graph representative of the clock signal network layout, the graph comprising a plurality of logical edges;
   identifying a to-be-inserted buffer location that comprises a location on a net segment of the plurality of net segments to insert a buffer;
   selecting a selected logical edge from the plurality of logical edges used to insert the buffer based on at least one of the to-be-inserted buffer location, the first hierarchy, the second hierarchy, or a combination thereof; and
   inserting the buffer into the clock signal network layout based on the selected logical edge, wherein the graph comprises a directed acyclic graph (DAG), the plurality of logical edges comprises a plurality of directed edges, and wherein selecting the selected logical edge, comprises:
   identifying a set of directed edges from the plurality of directed edges of the DAG;
   assigning a buffering context comprising a power domain metric to each of the directed edges in the identified set; and
   using the buffering context of each of the directed edges in the identified set to select the selected logical edge.

16. The method of claim 15, wherein the buffering context comprises the power domain metric, a module domain metric, or a combination thereof.

17. The method of claim 15, wherein identifying the set of directed edges from the plurality of directed edges of the DAG, comprises:
   navigating the DAG via a bottom up traversal until a port node is reached;
   identifying all directed edges of the plurality of directed edges traversed during the navigation; and
   identifying a directed edge upstream of the port node that points to the port node.

18. A non-transitory, computer storage medium storing instructions, which when executed by a machine, cause the machine to perform operations comprising:
   receiving a clock signal network layout that comprises:
   a clock source electrically coupled to a plurality of clock sinks via a plurality of net segments;
   a first hierarchy bounding a first region of the clock signal network layout; and
   a second hierarchy bounding a second region of the clock signal network layout;
   creating a graph representative of the clock signal network layout, the graph comprising a plurality of logical edges;
   identifying a to-be-inserted buffer location that comprises a location on a net segment of the plurality of net segments to insert a buffer;
   selecting a selected logical edge from the plurality of logical edges used to insert the buffer based on at least one of the to-be-inserted buffer location, the first hierarchy, the second hierarchy, or a combination thereof; and
   inserting the buffer into the clock signal network layout based on the selected logical edge, wherein the graph comprises a directed acyclic graph (DAG), the plurality of logical edges comprises a plurality of directed edges, and wherein selecting the selected logical edge, comprises:
   identifying a set of directed edges from the plurality of directed edges of the DAG;
   assigning a buffering context comprising a power domain metric to each of the directed edges in the identified set; and
   using the buffering context of each of the directed edges in the identified set to select the selected logical edge.

19. The non-transitory, computer storage medium of claim 18, wherein the buffering context comprises the power domain metric, a module domain metric, or a combination thereof.

* * * * *